United States Patent
Asanuma

(10) Patent No.: US 8,036,697 B2
(45) Date of Patent: Oct. 11, 2011

(54) WIRELESS COMMUNICATION APPARATUS AND WIRELESS COMMUNICATION METHOD

(75) Inventor: Yutaka Asanuma, Tokyo (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 293 days.

(21) Appl. No.: 12/488,756

(22) Filed: Jun. 22, 2009

(65) Prior Publication Data

US 2010/0167660 A1 Jul. 1, 2010

(30) Foreign Application Priority Data

Dec. 25, 2008 (JP) ................................. 2008-330843

(51) Int. Cl.
 *H04B 17/00* (2006.01)
 *H04B 1/00* (2006.01)
 *H04B 7/00* (2006.01)
(52) U.S. Cl. .... 455/522; 455/69; 455/67.11; 455/67.13; 455/226.1
(58) Field of Classification Search .................. 455/522, 455/69, 226.1, 67.13
See application file for complete search history.

(56) References Cited

U.S. PATENT DOCUMENTS

| | | | |
|---|---|---|---|
| 6,775,548 B1 * | 8/2004 | Rong et al. ................. | 455/452.2 |
| 7,209,517 B2 * | 4/2007 | Sindhushayana et al. .... | 375/225 |
| 7,701,911 B2 * | 4/2010 | Soliman ........................ | 370/335 |
| 7,702,351 B2 * | 4/2010 | Soliman ........................ | 455/522 |
| 7,746,816 B2 * | 6/2010 | Attar et al. .................... | 370/318 |

OTHER PUBLICATIONS

3GPP TS 36.213 V8.2.0 ; (Mar. 2008).
3GPP IMT Advanced Workshop Rev, 080058 Summary of LTE Advanced Requirements presented at the workshop (Apr. 2008).

* cited by examiner

*Primary Examiner* — Tilahun B Gesesse
(74) *Attorney, Agent, or Firm* — Maschoff Gilmore & Israelsen

(57) ABSTRACT

A reception unit measures a reception power level of a reference signal which is received from a base station apparatus BS. A reception signal processing unit acquires information indicative of a transmission power level of the reference signal. A control unit finds a path loss on the basis of the reception power level and this information. The control unit determines, on the basis of the path loss, a transmission power level of that one of two transmission frequency bands, which is closer to a frequency band with respect to which the pass loss has been measured. The control unit determines a transmission power level of the other transmission frequency band, which is farther from the frequency band with respect to which the pass loss has been measured, by correcting the transmission power level on the basis of a correction value based on a difference in frequency.

14 Claims, 2 Drawing Sheets

WIRELESS COMMUNICATION APPARATUS AND WIRELESS COMMUNICATION METHOD

CROSS-REFERENCE TO RELATED APPLICATIONS

Figure 1:
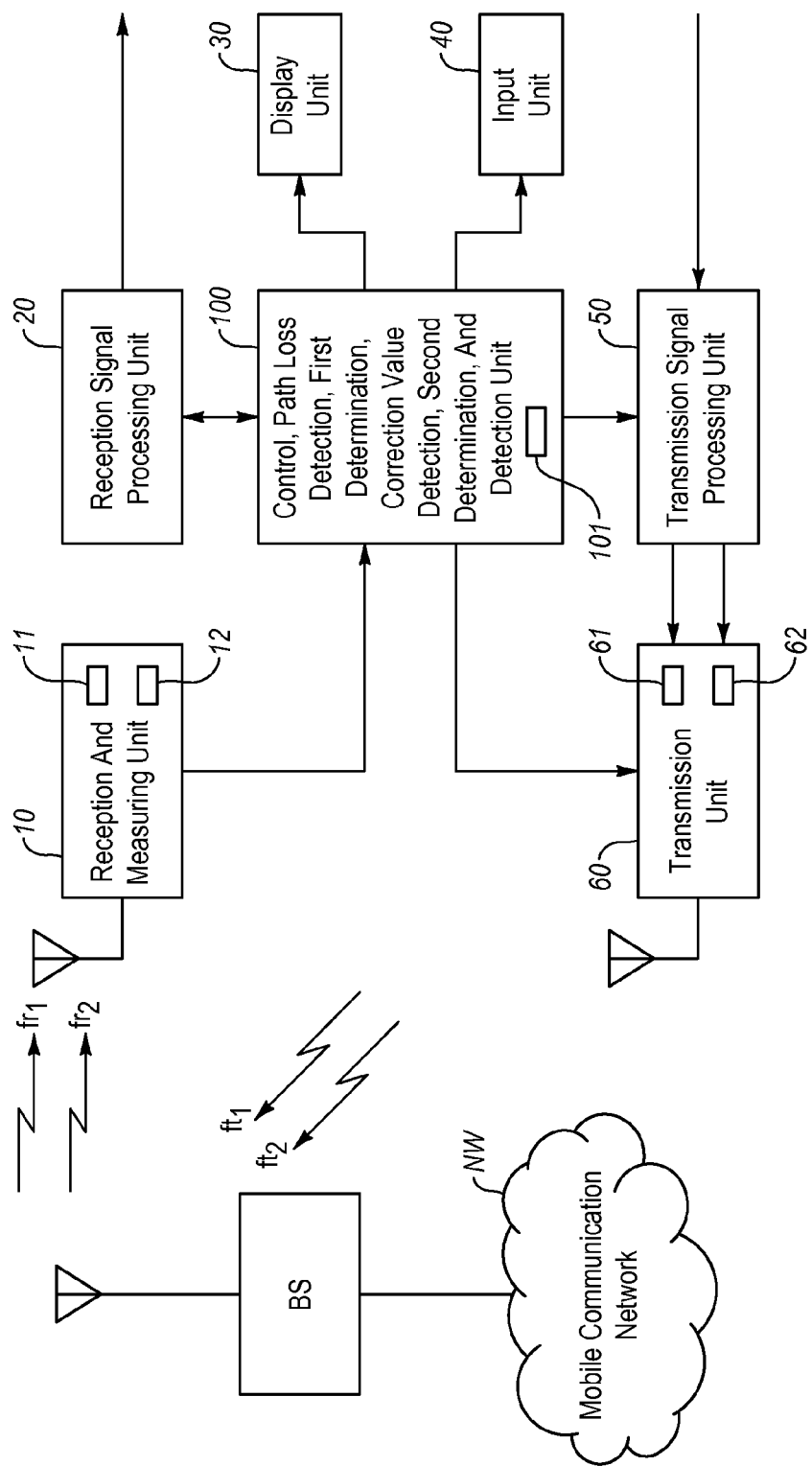

This application is based upon and claims the benefit of priority from prior Japanese Patent Application No. 2008-330843, filed Dec. 25, 2008, the entire contents of which are incorporated herein by reference.

BACKGROUND OF THE INVENTION

1. Field of the Invention

The present invention relates to a wireless communication apparatus which is used, for example, in a cellular system.

2. Description of the Related Art

As is well known, in a mobile communication system such as a cellular system, the transmission power of a wireless communication apparatus is controlled. In general, the transmission power control aims at setting the reception quality at a desired value. In the transmission power control of a mobile wireless terminal apparatus in the cellular system, the reception quality in a base station apparatus is made to fall within a desired range.

The transmission power control is determined by a propagation loss (path loss), and noise (N)+interference (I). The measurement of the pass loss is executed by comparing transmission power and reception power. The transmission power is information which is possessed by a transmission side, and the reception power is control information which is possessed by a reception side. Thus, the exchange (signaling) of control information is necessary between the transmission side and the reception side In a practically implemented cellular system (see, e.g. 3GPP TS 36.213 V8.2.0 (March 2008)), in the mobile wireless terminal apparatus, the measurement of path loss, which is used in the power control of an uplink for transmission to a base station apparatus, is executed, in some cases, on the basis of the transmission power of a downlink for transmission from the base station and the reception power in the mobile wireless terminal apparatus. Specifically, the base station apparatus reports transmission power to the mobile wireless terminal apparatus, and the mobile wireless terminal apparatus finds downlink reception power and measures downlink path loss on the basis of this reception power and the reported transmission power.

Exactly speaking, the downlink path loss and the uplink path loss are different. However, these are almost common with respect to the distance loss and shadowing loss. The downlink path loss can be measured by the mobile wireless terminal apparatus if the information relating to the transmission power is reported from the base station apparatus. Thus, in the uplink transmission power control, too, the downlink path loss is utilized as an element for determining the transmission power set value.

In the meantime, there has been developed a system wherein a plurality of frequency bands are allocated to a mobile wireless terminal apparatus, and these plural frequency bands are put together and practically used as a single system band (see, e.g. 3GPP IMT advanced Workshop REV-080058 Summary of LTE Advanced Requirements presented at the workshop (April 2008)). In this system, even discrete frequency bands can be used as a single system band and, therefore, the operation efficiency can be improved. However, in order to enable simultaneous transmission/reception in plural frequency bands, it is desirable to take a measure to prevent the apparatus structure from becoming too complex, although the apparatus structure tends to become complex in this case.

In addition, in the case where the discrete frequency bands are used as the single system band, as described above, the frequency for measuring path loss and the frequency band for executing transmission power control become different. In this case, since the measured path loss and the path loss of the object of transmission power control are different, there arises a problem that good transmission power control cannot be executed.

BRIEF SUMMARY OF THE INVENTION

The present invention has been made in order to solve the above-described problems, and the object of the invention is to provide a wireless communication apparatus and a wireless communication method, which can execute good transmission power control even in the case where a plurality of discrete frequency bands are practically used as a single system band.

In order to achieve the above object, the present invention provides a wireless communication apparatus which transmits a radio signal of a first frequency and a radio signal of a second frequency, comprising: information reception unit which receives information indicative of a transmission power of a counterpart apparatus; measuring unit which measures a reception level of a reception signal which is closer to the first frequency than to the second frequency; path loss detection unit which finds a path loss on the basis of the information that is received by the information reception unit and the reception level that is measured by the measuring unit; first determination unit which determines a transmission power of a radio signal of the first frequency on the basis of the path loss that is found by the path loss detection unit; correction value detection unit which finds a difference between a path loss of the first frequency and a path loss of the second frequency; second determination unit which determines a transmission power of a radio signal of the second frequency on the basis of the path loss that is found by the path loss detection unit and the difference in path loss which is found by the correction value detection unit; first transmission unit which transmits the radio signal of the first frequency with the transmission power that is determined by the first determination unit; and second transmission unit which transmits the radio signal of the second frequency with the transmission power that is determined by the second determination unit.

As has been described above, in the present invention, a path loss is measured, and a transmission power level of the first frequency, which is closer to a frequency with respect to which the pass loss has been measured, is determined on the basis of the path loss. A transmission power level of the second frequency, which is farther from the frequency with respect to which the pass loss has been measured, is determined on the basis of the path loss and the difference in pass loss between the first frequency and the second frequency.

Therefore, the present invention can provide a wireless communication apparatus and a wireless communication method wherein even in the case of using two discrete frequencies as a single system band, good transmission power control can be executed in the two transmission frequencies, and, moreover, since it suffices to measure only one path loss, the circuit configuration does not need to be made complex, and the implementation by a low-load process is realized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL
VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

Figure 2:
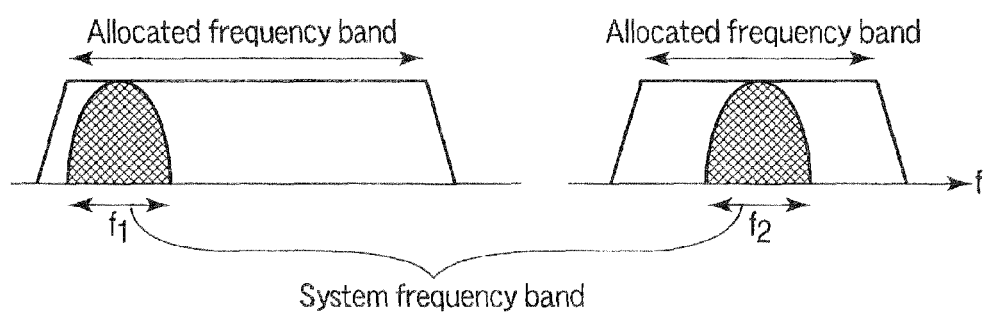

FIG. 1 is a circuit block diagram showing the structure of an embodiment of a mobile wireless terminal apparatus according to the present invention; and FIG. 2 is a view for explaining a system band of the mobile wireless terminal apparatus shown in FIG. 1.

DETAILED DESCRIPTION OF THE INVENTION

An embodiment of the present invention will now be described with reference to the accompanying drawings.

First Embodiment

FIG. 1 Shows the structure of a mobile wireless terminal, apparatus according to a first embodiment of the present invention. This mobile wireless terminal apparatus is a mobile station of a cellular system according to the 3GPP IMT advanced Workshop REV-080058 Summary of LTE Advanced Requirements presented at the workshop (April 2008). As shown on FIG. 2, in two allocated frequency bands, two frequency bands f1 and f2 for use are utilized as a single system band. Specifically, a mobile wireless terminal apparatus and a base station apparatus BS execute communication by making use of two frequency bands as a single system band in each of an uplink and a downlink.

As shown in FIG. 1, the mobile wireless terminal apparatus includes a reception unit 10, a reception signal processing unit 20, a display unit 30, an input unit 40, a transmission signal processing unit 50, a transmission unit 60 and a control unit 100.

The reception unit 10 includes two receivers 11 and 12 which support, e.g. an OFDM (Orthogonal Frequency Division Multiplexing) method, thus being able to simultaneously receive radio signals of two frequency bands, which are transmitted from a base station apparatus that is accommodated in a mobile communication network NW. Of the two receivers, the receiver 11 receives a radio signal of a frequency fr1 of a first reception frequency band, and the receiver 12 receives a radio signal of a frequency fr2 of a second reception frequency band. The frequencies fr1 and fr2 are designated by the control unit 100. The two receivers 11 and 12 frequency-convert the received radio signals to baseband signals, demodulate them and produce reception signals.

In addition, the reception unit 10 receives one of a reference signal of the first reception frequency band and a reference signal of the second reception frequency band, and measures a reception power level. The measurement result is reported to the control unit 100. The reference signal is transmitted from the base station apparatus BS with a fixed transmission power.

The reception signal processing unit 20 demodulates the two reception signals which are received by the reception unit 10 and obtains reception data, and further decodes the reception data and obtains reception data of two systems. In addition, the reception signal processing unit 20 compounds the reception data of the two systems and restores single reception data, and outputs the reception data to a rear-stage data processing unit (not shown). The restored reception data can contain various media data such as audio and video, and the restored reception data is the data which, when transmitted from the base station apparatus BS to the mobile wireless terminal apparatus, was divided for allocation to the two frequency bands.

The reception signal processing unit 20 obtains control information as the above-described reception data from the signal received from the base station apparatus BS. This control information includes information indicative of the transmission power level of the reference signal, and this information is reported to the control unit 100.

The display unit 30 is a display device using an organic EL (Electro Luminescence) display or an LCD (Liquid Crystal Display). The display unit 30 is driven and controlled by the control unit 100, and the display unit 30 displays text and video, and provides visual information to users. For example, video, which is based on video data included in the reception data, is displayed by the driving control of the control unit 100.

The input unit 40 is an input device using a key switch or a touch panel, and the input unit 40 accepts a request from the user, and sends the accepted request to the control unit 100.

In order to transmit transmission data, which is to be transmitted to a communication counterpart, with use of two frequency bands, the transmission signal processing unit 50 divides the transmission data into two data, and generates, for example, two OFDM-modulated transmission signals by using these two data.

The transmission unit 60 includes two transmitters 61 and 62 corresponding to the modulation method that is used in the transmission signal processing unit 50. Of the two transmitters, the transmitter 61 wirelessly transmits one of two transmission signals by using a frequency ft1 of a first transmission frequency band, and the transmitter 62 wirelessly transmits the other transmission signal by using a frequency ft2 of a second transmission frequency band. The frequencies ft1 and ft2 are designated by the control unit 100. It is assumed that the frequency ft1 is closer to the frequency fr1 than the frequency ft2. The frequency ft2 is closer to the frequency fr2 than the frequency ft1. The transmission powers of the two transmitters 61 and 62 are controlled by the control unit 100.

The control unit 100 includes a microprocessor and operates according to control programs and control data, which are stored in a built-in memory unit 101. The control unit 100 executes overall control of the respective parts of the mobile wireless terminal apparatus, and realizes voice communication and data communication. In addition, the control unit 100 has communication control functions which execute transmission/reception of e-mails, Web browsing, display of moving pictures based on downloaded streaming data on the display unit 30, and executes voice communication.

Besides, the control unit 100 has a transmission power control function which controls uplink transmission power and keeps within a predetermined range the reception quality in the base station apparatus BS of a signal which is transmitted from the mobile wireless terminal apparatus.

Next, the operation of the mobile wireless terminal apparatus according to the first embodiment is described. In the description below, in particular, the transmission power control function relating to the present invention is described in detail.

In digital communication, the reception quality is determined by Eb/No on the basis of power Eb and noise density No per 1 information bit. If transmission parameters (e.g. transmission rate and recording method) of the transmission signal processing unit 50 and transmission unit 60 are already known in the base station apparatus BS, the Eb/No can be replaced with a reception SNR in the base station apparatus BS. If the noise N of the reception SNR is substantially constant, the transmission power control may be a control for keeping reception power S constant.

In order to keep constant the reception power S in the base station apparatus BS, it is necessary to compensate the path loss in the uplink. The measurement of the uplink path loss is executed by estimation from the measurement result of path loss in the downlink. Specifically, the control unit 100 measures the downlink path loss by comparing the downlink transmission power level, which is reported as control information from the base station apparatus BS, and the reception power which is measured by the reception unit 10. On the basis of this measurement result of the downlink path loss, the control unit 100 estimates the path loss in the uplink.

For this purpose, the control unit 100 first acquires the transmission power level of a reference signal of a first reception frequency band from the reception signal processing unit 20, and then acquires the reception power level of the reference signal of the first reception frequency band, which is measured by the reception unit 10. The control unit 100 compares the transmission power level and the reception power level, and finds pass loss PL in the first reception frequency band, for example, from the difference between the transmission power level and the reception power level.

The control unit 100 determines a transmission power level Pf1 of a frequency ft1 of the first transmission frequency band according to the following equation (1). In equation (1), Po [dBm] is a preset predetermined value, and f1(PL) is a function of the path loss PL, and is, for example, f1(PL)=α·PL (α is a constant). In addition, g is a transmission parameter which is determined by the transmission method (e.g. transmission rate and recording method).

$$Pf1 = Po + f1(PL) + g \quad (1)$$

Subsequently, the control unit 100 determines a transmission power level Pf2 of a frequency ft2 of the second transmission frequency band according to the following equation (2). Specifically, f1(PL) is corrected by a correction value h(ft1,ft2), and the transmission power Pf2 is determined.

$$Pf2 = Pf1 + h(ft1, ft2) \quad (2)$$

The frequency f and the path loss L in path distance 1 [m] are determined by the following equation (3). Thus, the correction value h(ft1,ft2) is set to be a value that is found by the following equation (4). In the case of ft1<ft2, β is a predetermined positive value. The reason why β is added to increase the correction value h(ft1,ft2), as shown in equation (4), is that attentions is paid to the fact that diffraction occurs less easily as the frequency becomes higher, and better quality can be maintained and the path loss becomes smaller as the transmission power becomes higher.

$$L(f) = 20 \log_{10}(4\pi f/c) \quad (3)$$

$$h(ft1, ft2) = \beta\{L(ft2) - L(ft1)\} \quad (4)$$

The control unit 100 reports the thus determined transmission power level Pf1 and transmission power level Pf2 to the transmission unit 60. Then, the transmission power level Pf1 is set in the transmitter 61, and the transmission power level Pf2 is set in the transmitter 62. Thereby, the transmitter 61 transmits a radio signal of the frequency ft1 with the transmission power level Pf1, and the transmitter 62 transmits a radio signal of the frequency ft2 with the transmission power level Pf2.

The correction value h(ft1,ft2) has been described as being calculated on the basis of the above equation (4). Alternatively, a table, in which the correction value h(ft1,ft2) is associated with the combination of the frequency ft1 and frequency ft2, may be prepared in advance and stored. The correction value h(ft1,ft2), which is associated with the frequency ft1 and frequency ft2 for use in transmission, may be read out from the table and used.

As has been described above, in the mobile wireless terminal apparatus having the above-described structure, the path loss in the downlink is measured. The transmission power level, which is closer to that one of the two transmission frequency bands, with respect to which the path loss has been measured, is determined on the basis of the path loss. The transmission power level, which is farther from that one of the two transmission frequency bands, with respect to which the path loss has been measured, is determined by correcting the transmission power level, which is closer to that one of the two transmission frequency bands, with respect to which the path loss has been measured, on the basis of the correction value corresponding to the frequency difference.

Therefore, according to the mobile wireless terminal apparatus having the above-described structure, even in the case of using two discrete frequency bands as a single system band, good transmission power control can be executed in the two transmission bands. Moreover, since it suffices to measure only one path loss, the circuit configuration does not need to be made complex, and the implementation by a low-load process is realized.

Second Embodiment

Next, a mobile wireless terminal apparatus according to a second embodiment of the present invention is described. The apparent structure of the mobile wireless terminal apparatus according to this embodiment is substantially the same as that of the mobile wireless terminal apparatus shown in FIG. 1, so only differences from the first embodiment are mainly described with reference to FIG. 1.

The mobile wireless terminal apparatus according to the second embodiment executes a closed-loop transmission power control. Thus, the base station apparatus BS receives signals of two frequencies ft1 and ft2 from the mobile wireless terminal apparatus, and measures the power levels thereof. On the basis of the measurement result, the base station apparatus BS sends to the mobile wireless terminal apparatus TPC (Transmit Power Control) commands for controlling the transmission power levels, so that the reception power level of each frequency band in the base station apparatus BS may fall within a predetermined range. The base station apparatus BS transmits, as the TPC commands, a command TPC for controlling the transmission power level of the frequency ft1 of the first transmission frequency band and a command TPC2 for controlling the transmission power level of the frequency ft2 of the second transmission frequency band to the mobile wireless terminal apparatus.

The TPC command may be of an accumulation type or of an absolute value type. In the case of the accumulation-type TPC command, the terminal, which has received the TPC command that was sent from the base station apparatus BS, varies the transmission power in accordance with the TPC command with reference to the previous transmission power level. In the case of the absolute-value-type TPC command, the terminal, which has received the TPC command that was sent from the base station apparatus, varies the transmission power from a predetermined transmission power in accordance with the TPC command. Either type is applicable.

The TPC commands (TPC1 and TPC2), which are sent from the base station apparatus BS, are extracted (detected) from the restored reception data in the reception signal processing unit 20, and are output to the control unit 100. The control unit 100 acquires the transmission power level of the reference signal of the first reception frequency band from the reception signal processing unit 20, and acquires the reception power level of the reference signal of the first reception frequency band, which has been measured by the reception unit 10. The control unit 100 compares the transmission power level and the reception power level, and finds the path loss PL in the first reception frequency band, for example, on the basis of the difference between the transmission power level and the reception power level.

The control unit 100 determines the transmission power level Pf1 of the frequency ft1 of the first transmission frequency band according to the following equation (5). In the equation (5), Po [dBm] is a preset predetermined value, and f1(PL) is a function of the path loss PL, and is, for example, f1(PL)=α−PL (α is a constant). In addition, g is a transmission parameter which is determined by the transmission method (e.g. transmission rate and recording method). Besides, x(TPC1) is a function of the TPC command.

$$Pf1 = Po + f1(PL) + g + x(TPC1) \qquad (5)$$

Similarly, the control unit 100 determines the transmission power level Pf2 of the frequency ft2 of the second transmission frequency band according to the following equation (6). Specifically, using x(TPC2) in place of x(TPC1), the transmission power level Pf2 is determined. In the x(TPC2), compared to the x(TPC1), the TPC step size is set at a greater value.

$$Pf2 = Po + f2(PL) + g + x(TPC2) \qquad (6)$$

The control unit 100 informs the transmission unit 60 of the thus determined transmission power level Pf1 and transmission power level Pf2. Then, the transmission power level Pf1 is set in the transmitter 61, and the transmission power level Pf2 is set in the transmitter 62. Thereby, the transmitter 61 transmits a radio signal of the frequency ft1 with the transmission power level Pf1, and the transmitter 62 transmits a radio signal of the frequency ft2 with the transmission power level Pf2.

Next, a description is given by taking the accumulation-type TPC command as an example.

In the case where the TPC command (TPC1 and TPC2) is a 1-bit command, there are two instructions, i.e. a "lowering" instruction and a "raising" instruction. In this case, the step sizes of the decrease ("lowering" instruction) and the increase ("raising" instruction) of the transmission power level by the x(TPC1) are set at "−1, 1". On the other hand, the step sizes of the decrease and the increase of the transmission power level by the x(TPC2) are set at "−2, 2". Specifically, in the case of increasing (or decreasing) the transmission power level Pf1 of the frequency ft1 of the first transmission frequency band, an increase adjustment (or decrease adjustment) of 1 step is executed for one TPC command. On the other hand, in the case of increasing (or decreasing) the transmission power level Pf2 of the frequency ft2 of the second transmission frequency band, an increase adjustment (or decrease adjustment) of 2 steps is executed for one TPC command.

In the meantime, the step sizes of the decrease and increase may be set to asymmetric. If ft1<ft2, a greater path loss occurs in the transmission at the frequency ft2 than in the transmission at the frequency ft1. Thus, the step sizes of the decrease and increase of the transmission power level by the x(TPC1) are set at [−1, 1], and the step sizes of the decrease and increase of the transmission power level by the x(TPC2) are set at [−1, 2], so that the step size in the direction of increasing the power level is increased.

Conversely, if ft1>ft2, a less path loss occurs in the transmission at the frequency ft2 than in the transmission at the frequency ft1. Thus, the step sizes of the decrease and increase of the transmission power level by the x(TPC1) are set at [−1, 1], and the step sizes of the decrease and increase of the transmission power level by the x(TPC2) are set at [−2, 1], so that the step size in the direction of decreasing the power level is increased.

The TPC command may be formed as a 2-bit command, and the number of control steps may be set at four. In this case, the step sizes by the x(TPC1) are set at [−1, 0, 1, 3], while the step sizes by the x(TPC2) are set at [−2, 0, 1, 3]. Specifically, in the x(TPC1), in the case of increasing the transmission power level, the step size is "3" and is sufficiently large, and this is applicable to the case where the variation of the path environment is large. Thus, this step size is also adopted in the x(TPC2). On the other hand, the step size of "−1" for lowering the transmission power level is small. Thus, in the x(TPC2), by setting a greater value "−2", the step size is made applicable to the case where the variation of the path environment is large. Needless to say, the step sizes by the x(TPC1) are set at [−1, 0, 1, 3], while the step sizes by the x(TPC2) may be set at [−2, 0, 1, 4].

In addition, the TPC1 may be formed as a 1-bit command, while the TPC2 may be formed as a 2-bit command. In this case, the step sizes by the x(TPC1) are set at [−1, 1], while the step sizes by the x(TPC2) are set at [−2, 0, 1, 3]. Specifically, like the above-described setting of step sizes, compared to the step sizes that are used for the frequency ft1 with a less frequency difference from the frequency band at which the path loss PL is measured, the step sizes that are used for the frequency ft2 with a greater frequency difference therefrom are set to be greater, thereby compensating the difference in path loss.

Moreover, the base station apparatus BS may set the transmission cycle of the TPC2 to be shorter than the transmission cycle of the TPC1, and may set the transmission power control cycle for the frequency ft2, which has a greater frequency difference from the frequency band at which the path loss PL is measured, to be shorter than the transmission power control cycle for the frequency ft1 which has a less frequency difference therefrom. Thereby, the difference in path loss may be compensated.

In this case, if the reception signal processing unit 20 has detected a new TPC2, the control unit 100 determines a new transmission power level Pf2 according to the above-described equation (6), and sets the new transmission power level Pf2 in the transmitter 62. Thereby, the transmitter 62 sends a radio signal of the frequency ft2 on the basis of the transmission power level Pf2 which is updated with a shorter cycle than the frequency ft1.

As has been described above, in the mobile wireless terminal apparatus having the above-described structure, the downlink path loss is measured, and the transmission power level of the band, which is closer to the downlink frequency band of the two reception/transmission frequency bands, is determined on the basis of the path loss and the TPC command. The transmission power level of the band, which is farther from the downlink frequency band, is determined on the basis of the path loss and the TPC command that has a greater step size than the above-described TPC command.

According to the mobile wireless terminal apparatus having the above-described structure, the transmission power level of the band, which is farther from the downlink frequency band that has been used for the measurement of path loss, is controlled with a greater step size than the step size of the TPC command that is used in the transmission power control of the band closer to the downlink frequency band. Thus, this control is applicable to the case where the variation of the path environment is large. Therefore, even in the case where the two discrete frequency bands are used as a single system band, good transmission power control can be executed in the two transmission bands. Furthermore, since it suffices to measure only one path loss, the circuit configuration does not need to be made complex, and the implementation by a low-load process is realized.

The present invention is not limited directly to the above-described embodiments. In practice, the structural elements can be modified and embodied without departing from the spirit of the invention. Various inventions can be made by properly combining the structural elements disclosed in the embodiments. For example, structures, in which some structural elements are omitted from all the structural elements disclosed in the embodiments, are thinkable. Furthermore, structural elements in different embodiments may properly be combined.

For instance, in the above-described embodiments, the transmission power control in the mobile wireless terminal apparatus has been described by way of example, but the transmission power control is applicable to the base station apparatus BS.

Needless to say, the invention can similarly be implemented even if various modifications are made without departing from the spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication apparatus which transmits a radio signal of a first frequency and a radio signal of a second frequency, comprising:
   information reception unit which receives information indicative of a transmission power of a counterpart apparatus;
   measuring unit which measures a reception level of a reception signal which is closer to the first frequency than to the second frequency;
   path loss detection unit which finds a path loss on the basis of the information that is received by the information reception unit and the reception level that is measured by the measuring unit;
   first determination unit which determines a transmission power of a radio signal of the first frequency on the basis of the path loss that is found by the path loss detection unit;
   correction value detection unit which finds a difference between a path loss of the first frequency and a path loss of the second frequency;
   second determination unit which determines a transmission power of a radio signal of the second frequency on the basis of the path loss that is found by the path loss detection unit and the difference in path loss which is found by the correction value detection unit;
   first transmission unit which transmits the radio signal of the first frequency with the transmission power that is determined by the first determination unit; and
   second transmission unit which transmits the radio signal of the second frequency with the transmission power that is determined by the second determination unit.

2. The wireless communication apparatus according to claim 1, wherein the correction value detection unit includes:
   memory unit which stores a table in which the difference between the path loss of the first frequency and the path loss of the second frequency is associated with a combination of the first frequency and the second frequency; and
   detection unit which detects, with reference to the table stored in the memory unit, a difference in path loss, which corresponds to the combination between the first frequency that is used for transmission by the first transmission unit and the second frequency that is used for transmission by the second transmission unit.

3. A wireless communication apparatus which transmits a radio signal of a first frequency and a radio signal of a second frequency, comprising:
   information reception unit which receives information indicative of a transmission power of a counterpart apparatus;
   measuring unit which measures a reception level of a reception signal which is closer to the first frequency than to the second frequency;
   path loss detection unit which finds a path loss on the basis of the information that is received by the information reception unit and the reception level that is measured by the measuring unit;
   first information reception unit which receives, from the counterpart apparatus, first control information for controlling a transmission power of a radio signal of the first frequency;
   second information reception unit which receives, from the counterpart apparatus, second control information for controlling a transmission power of a radio signal of the second frequency, a variable amount of the second control information being greater than a variable amount of the first control information;
   first determination unit which determines the transmission power of the radio signal of the first frequency on the basis of the path loss that is found by the path loss detection unit and the first control information that is received by the first information reception unit;
   second determination unit which determines the transmission power of the radio signal of the second frequency on the basis of the path loss that is found by the path loss detection unit and the second control information that is received by the second information reception unit;
   first transmission unit which transmits the radio signal of the first frequency with the transmission power that is determined by the first determination unit; and
   second transmission unit which transmits the radio signal of the second frequency with the transmission power that is determined by the second determination unit.

4. The wireless communication apparatus according to claim 3, wherein in a case where the second frequency is higher than the first frequency, a variable amount by which a transmission power indicated by the second control information is increased is set to be greater than a variable amount by which a transmission power indicated by the first control information is increased.

5. The wireless communication apparatus according to claim 3, wherein in a case where the second frequency is lower than the first frequency, a variable amount by which a transmission power indicated by the second control information is decreased is set to be greater than a variable amount by which a transmission power indicated by the first control information is decreased.

6. The wireless communication apparatus according to claim 3, wherein a number of control steps, which is indicated by the second control information, is set to be greater than a number of control steps, which is indicated by the first control information, and a maximum variable amount of a transmission power, which is indicated by the second control information, is set to be greater than a maximum variable amount of a transmission power, which is indicated by the first control information.

7. The wireless communication apparatus according to claim 3, wherein the second information reception unit receives the second control information with a shorter cycle than the first information reception unit, and
 the second determination unit determines, when the second information reception unit has received the second control information, the transmission power of the radio signal of the second frequency on the basis of the path loss that is found by the path loss detection unit and the second control information that is received by the second information reception unit.

8. A wireless communication method for transmitting a radio signal of a first frequency and a radio signal of a second frequency, comprising:
 an information reception step of receiving information indicative of a transmission power of a counterpart apparatus;
 a measuring step of measuring a reception level of a reception signal which is closer to the first frequency than to the second frequency;
 a path loss detection step of finding a path loss on the basis of the information that is received in the information reception step and the reception level that is measured in the measuring step;
 a first determination step of determining a transmission power of a radio signal of the first frequency on the basis of the path loss that is found in the path loss detection step;
 a correction value detection step of finding a difference between a path loss of the first frequency and a path loss of the second frequency;
 a second determination step of determining a transmission power of a radio signal of the second frequency on the basis of the path loss that is found in the path loss detection step and the difference in path loss which is found in the correction value detection step;
 a first transmission step of transmitting the radio signal of the first frequency with the transmission power that is determined in the first determination step; and
 a second transmission step of transmitting the radio signal of the second frequency with the transmission power that is determined in the second determination step.

9. The wireless communication method according to claim 8, wherein the correction value detection step includes:
 a memory step of storing a table in which the difference between the path loss of the first frequency and the path loss of the second frequency is associated with a combination of the first frequency and the second frequency; and
 a detection step of detecting, with reference to the table stored in tie memory step, a difference in path loss, which corresponds to the combination between the first frequency that is used for transmission in the first transmission step and the second frequency that is used for transmission in the second transmission step.

10. A wireless communication method for transmitting a radio signal of a first frequency and a radio signal of a second frequency, comprising:
 an information reception step of receiving information indicative of a transmission power of counterpart apparatus;
 a measuring step of measuring a reception level of a reception signal which is closer to the first frequency than to the second frequency;
 a path loss detection step of finding a path loss on the basis of the information that is received in the information reception step and the reception level that is measured in the measuring step;
 a first information reception step of receiving, from the counterpart apparatus, first control information for controlling a transmission power of a radio signal of the first frequency;
 a second information reception step of receiving, from the counterpart apparatus, second control information for controlling a transmission power of a radio signal of the second frequency, a variable amount of the second control information being greater than a variable amount of the first control information;
 a first determination step of determining the transmission power of the radio signal of the first frequency on the basis of the path loss that is found in the path loss detection step and the first control information that is received in the first information reception step;
 a second determination step of determining the transmission power of the radio signal of the second frequency on the basis of the path loss that is found in the path loss detection step and the second control information that is received in the second information reception step;
 a first transmission step of transmitting the radio signal of the first frequency with the transmission power that is determined in the first determination step; and
 a second transmission step of transmitting the radio signal of the second frequency with the transmission power that is determined in the second determination step.

11. The wireless communication method according to claim 10, wherein in a case where the second frequency is higher than the first frequency, a variable amount by which a transmission power indicated by the second control information is increased is set to be greater than a variable amount by which a transmission power indicated by the first control information is increased.

12. The wireless communication method according to claim 10, wherein in a case where the second frequency is lower than the first frequency, a variable amount by which a transmission power indicated by the second control information is decreased is set to be greater than a variable amount by which a transmission power indicated by the first control information is decreased.

13. The wireless communication method according to claim 10, wherein a number of control steps, which is indicated by the second control information, is set to be greater than a number of control steps, which is indicated by the first control information, and a maximum variable amount of a transmission power, which is indicated by the second control information, is set to be greater than a maximum variable amount of a transmission power, which is indicated by the first control information.

14. The wireless communication method according to claim 10, wherein the second information reception step includes a step of receiving the second control information with a shorter cycle than in the first information reception step, and the second determination step includes a step of determining, when the second control information has been received in the second information reception step, the transmission power of the radio signal of the second frequency on the basis of the path loss that is found in the path loss detection step and the second control information that is received in the second information reception step.

* * * * *